United States Patent
Favier

(10) Patent No.: US 9,472,020 B2
(45) Date of Patent: *Oct. 18, 2016

(54) METHOD AND APPARATUS FOR DISCRETE ELEMENT MODELING INVOLVING A BULK MATERIAL

(71) Applicant: DEM Solutions Ltd., Edinburgh, Midlothian (GB)

(72) Inventor: John Favier, Edinburgh (GB)

(73) Assignee: DEM SOLUTIONS LIMITED, Edinburgh (GB)

( * ) Notice: Subject to any disclaimer, the term of this patent is extended or adjusted under 35 U.S.C. 154(b) by 544 days.

This patent is subject to a terminal disclaimer.

(21) Appl. No.: 14/040,417

(22) Filed: Sep. 27, 2013

(65) Prior Publication Data

US 2014/0039858 A1 Feb. 6, 2014

Related U.S. Application Data

(63) Continuation of application No. 13/077,740, filed on Mar. 31, 2011, now Pat. No. 8,560,286.

(51) Int. Cl.
  *G06G 7/48* (2006.01)
  *G06T 17/00* (2006.01)
  (Continued)

(52) U.S. Cl.
  CPC ........... *G06T 17/00* (2013.01); *G06F 17/5009* (2013.01); *G06T 13/20* (2013.01); *G06F 2217/16* (2013.01); *G06T 2210/56* (2013.01)

(58) Field of Classification Search
  CPC . G06F 17/5009; G06F 17/5018; G01V 9/00; G01V 1/00; B29C 45/7693; G06Q 10/0875; A61F 13/15658; G01N 3/303
  See application file for complete search history.

(56) References Cited

U.S. PATENT DOCUMENTS

| | | | | |
|---|---|---|---|---|
| 8,554,527 B2* | 10/2013 | Nishiura | ............. | G06F 17/5009 703/7 |
| 2008/0215166 A1* | 9/2008 | Blessing | ........... | A61F 13/15658 700/31 |
| 2009/0132218 A1* | 5/2009 | Ledgerwood, III | .... | E21B 10/00 703/7 |

(Continued)

OTHER PUBLICATIONS

Chen, F. "Coupled flow discrete element method applications in granular porous media using open source codes", University of Tennessee, 2009.*

(Continued)

*Primary Examiner* — Kandasamy Thangavelu
(74) *Attorney, Agent, or Firm* — Park, Vaughan, Fleming & Dowler LLP

(57) ABSTRACT

Computer-implemented methods and systems are described for discrete element modelling of a plurality of discrete elements corresponding to particles and physical geometry elements. The disclosed embodiments provide a plurality of discrete element material models, each discrete element material model corresponding to a respective bulk material and containing (i) information regarding the properties of particles within said bulk material, and (ii) information regarding the behavior of interactions between such particles. The following information can be received from a user: a selection of a bulk material for use in a simulation, and a specification of properties associated with the selected bulk material. The disclosed embodiments can perform a discrete element model simulation on a set of particles, wherein the simulation uses the information regarding the behavior of interactions between particles from the discrete element material model for a user-selected bulk material.

20 Claims, 8 Drawing Sheets

(51) Int. Cl.
*G06F 17/50* (2006.01)
*G06T 13/20* (2011.01)

(56) References Cited

U.S. PATENT DOCUMENTS

| | | | | |
|---|---|---|---|---|
| 2009/0266891 A1* | 10/2009 | Santucci | ............ | G06Q 10/0875 235/385 |
| 2010/0042383 A1* | 2/2010 | Shi | ............ | G01N 3/303 703/2 |
| 2010/0042386 A1* | 2/2010 | Milne | ............ | G06F 17/5018 703/6 |
| 2010/0169062 A1* | 7/2010 | Linn | ............ | B29C 45/7693 703/2 |
| 2011/0032255 A1* | 2/2011 | Favier | ............ | G06F 17/5009 345/420 |
| 2011/0077918 A1* | 3/2011 | Mutlu | ............ | G01V 9/00 703/2 |
| 2011/0106507 A1* | 5/2011 | Lepage | ............ | G01V 11/00 703/2 |
| 2011/0295563 A1* | 12/2011 | McDaniel | ............ | G06F 17/5009 703/1 |

OTHER PUBLICATIONS

Guo et al., "Granular shear flows of flat disks and elongated rods without and with friction", Physics of fluids, 2013.*
Ramm et al., "On some features of polygonal discrete element model", Springer 2011.*
Cundall et al., "Numerical modeling of discontinua", Engineering computations, 1992.*
Kruggel-Emden et al., "Selection of an appropriate time integration scheme for the discrete element method", Computers and chemical engineering, 2008.*
http://www.schrage.de/en/schrage-informs/glossary/bulk-material.html, "Definition of Bulk Material".*

* cited by examiner

METHOD AND APPARATUS FOR DISCRETE ELEMENT MODELING INVOLVING A BULK MATERIAL

RELATED APPLICATION

This application is a continuation application of, and claims priority to, U.S. application Ser. No. 13/077,740 (to be issued as U.S. Pat. No. 8,560,286), entitled "Method and apparatus for discrete element modelling involving a bulk material," by the same inventors, filed on 31 Mar. 2011.

FIELD OF THE INVENTION

The present invention relates to a discrete element modeling (DEM) system that may be used for simulations involving a bulk material.

BACKGROUND OF THE INVENTION

Discrete element modeling (also referred to as discrete particle, distinct element, or distinct particle modeling) is used for simulating a wide range of physical, industrial, engineering and/or manufacturing processes and operations. The discrete elements, also referred to as particles, represent objects located in a three-dimensional space that interact dynamically with each other and their surroundings subject to specified physical models or heuristics. The physical interactions are often based on surface contact, although other forces, such as electromagnetic field effects and/or fluid drag, may also be involved. The particles are often defined as being of finite (non-zero) size, but may in some simulations be treated as point objects.

Discrete element modeling allows for the simulation, analysis and visualization of particulate flows, and is able to provide high-resolution information on properties such as particle kinematics, momentum, and heat and mass transfer in bulk particle deformation and flow. It is used for the design, development and testing of products and processes, allowing these to be performed faster and more accurately, thereby reducing development costs and time to market. Discrete element modelling finds application in a wide range of scientific and technological industries, for example, mining, mineral and materials processing, pharmaceutical, chemical, oil & gas production, and agricultural, construction and geo-technical engineering. An example of a discrete element modelling system is EDEM version 2.3, which is currently available from DEM Solutions of Edinburgh, UK.

Examples of particle behaviours that may be simulated and hence better understood via discrete element modeling include: the mining and excavation by machine of soil and rock, the transfer of materials between conveyors, the filling and emptying of hoppers, the mixing and blending of powders, the sieving and segregation of particles, the pneumatic transport of particles, the crushing and grinding of rocks and powders, the coating of tablets and pellets, the handling and charging of printer toner, etc. Such simulations generally involve a user having to specify details of the particles comprising the material (or materials) that are being modelled in the simulation.

SUMMARY OF THE INVENTION

One embodiment of the invention provides a computer-implemented method for discrete element modelling of a plurality of discrete elements corresponding to particles and physical geometry elements, wherein said modelling performs a simulation through time of physical interactions of the particles with each other and with the physical geometry elements in a three-dimensional space. The method comprises providing a plurality of discrete element material models, each discrete element material model corresponding to a respective bulk material and containing (i) information regarding the properties of particles within said bulk material, and (ii) information regarding the behaviour of interactions between such particles; receiving from a user: (i) a selection of a bulk material for use in a simulation, and (ii) a specification of properties associated with the selected bulk material; generating a set of particles of the selected bulk material for use in the simulation based on (i) the discrete element material model for the selected bulk material, and (ii) the properties of the bulk material specified by the user; and performing a discrete element model simulation on said set of particles, wherein said simulation uses the information regarding the behaviour of interactions between particles from the discrete element material model for the selected bulk material.

In some embodiments, different discrete element material models are provided for different respective states of a given bulk material, since such different states may affect the simulation of the bulk material. For example, certain variations in bulk stress state, moisture content, temperature and (or) chemical composition may impact one or more parameters such as particle size and shape, cohesion (and other particle interaction properties), and so on.

In some embodiments, providing a plurality of discrete element material models comprises storing said plurality of discrete element material models in a database, and offering the user a selection of bulk materials corresponding to respective discrete element material models in the database. The user may also be able to import discrete element material models from other sources. In some cases, the user therefore does not have to create a discrete element material model himself (herself), but rather can rely upon a pre-defined set of discrete element material models that are already available for use.

In some embodiments, the information regarding the properties of particles within said bulk material specifies the distribution of particle size and shape and the mechanical properties of the particles, and the properties associated with the selected bulk material that are specified by the user include at least one of: (i) a bulk material generation rate, and (ii) an initial location and kinematics of the bulk material. It will be appreciated that the exact set of parameters and properties specified for the particles and the bulk material will depend on the particular circumstances of a simulation, and may vary from one embodiment to another.

In some embodiments, the properties associated with the selected bulk material are used to update at least one of: (i) the information regarding the properties of particles within said bulk material, and (ii) the information regarding the behaviour of interactions between such particles within the discrete element material model for the selected material. In other cases, the properties associated with the selected bulk material may not impact the intrinsic properties of the particles themselves (such as size and shape), but rather are used to control the configuration of the simulation, such as regarding the initial location and kinematics of the particles.

In some embodiments, the processing of the bulk material during the simulation may lead to changes in the bulk material itself. These can be accommodated (for example) by updating the properties of the bulk material specified by the user as the discrete element model simulation progresses, or by updating the selected bulk material as the discrete element model simulation progresses.

In some embodiments, performing a discrete element model simulation on said set of particles comprises performing a preliminary, limited simulation to generate an ensemble of simulated particles of said selected bulk material; saving said ensemble of simulated particles of said selected bulk material; receiving from a user a further specification of properties associated with the selected bulk material; adapting said ensemble of simulated particles in accordance with the further specification of properties; and performing a further simulation using said adapted ensemble of simulated particles. Accordingly, one possibility is to create a set of the particles for a specified bulk material in advance, and then to adapt the particles to the particular requirements of a given simulation involving that bulk material as and when required.

Another embodiment of the invention provides a computer program product for discrete element modelling of a plurality of discrete elements corresponding to particles and physical geometry elements. The modelling performs a simulation through time of physical interactions of the particles with each other and with the physical geometry elements in a three-dimensional space. The computer program product comprises program instructions encoded on a machine-readable storage medium, said instructions, when loaded and executed by one or more computer processors, cause the one or more processors to execute a method such as described above.

Another embodiment of the invention provides an apparatus for discrete element modelling of a plurality of discrete elements corresponding to particles and physical geometry elements, wherein said modelling performs a simulation through time of physical interactions of the particles with each other and with the physical geometry elements in a three-dimensional space. The apparatus comprises: a database containing a plurality of discrete element material models, each discrete element material model corresponding to a respective bulk material and containing (i) information regarding the properties of particles within said bulk material, and (ii) information regarding the behaviour of interactions between such particles; a user interface for receiving: (i) a selection of a bulk material for use in a simulation, and (ii) a specification of properties associated with the selected bulk material; an initialization system for generating a set of particles of the selected bulk material for use in the simulation based on (i) the discrete element material model for the selected bulk material, and (ii) the properties of the bulk material specified by the user; and an execution engine for performing a discrete element model simulation on said set of particles, wherein said simulation uses the information regarding the behaviour of interactions between particles from the discrete element material model for the selected bulk material.

The computer program product may be implemented as a computer readable storage medium such as a disk drive, flash memory, optical disk, etc, containing a program comprising instructions that, when executed on a computer system, cause the computer system to implement the specified method. The apparatus may be implemented by one or more general purpose computers executing a computer program to perform the specified processing. The apparatus may also be implemented using at least some special purpose hardware for simulation. It will be appreciated that the computer program product and the apparatus mentioned above will generally benefit from the same features as described above in relation to the method embodiment of the invention.

The approach described herein therefore helps to provide a computer-implemented method for discrete element modelling of a plurality of discrete elements corresponding to particles and physical geometry elements in accordance with one embodiment of the invention. Such modelling performs a simulation through time of physical interactions of the particles with each other and with the physical geometry elements in a three-dimensional space. The simulation conditions are specified in a discrete element model input file that defines all of the model elements and their initial conditions and properties. The method provides a level data object (referred to herein as a discrete element material model) that contains data elements including model particle shape descriptors, model particle size and shape distribution, model particle mechanical properties, physical geometry mechanical properties, and one or more of particle-particle interaction model parameters, particle-geometry interaction model parameters, particle-fluid interaction model parameters and particle-electromagnetic field interaction model parameters for the purposes of discrete element method simulation. A discrete element model input file may be created using one or more discrete element material models chosen from a database of such models using a graphical user interface or otherwise selected using a look-up table, or by linking directly with an editor used to input the data elements in a discrete element material model. The initial mass or volumetric flow rate and any other static or dynamic properties of the model bulk materials in the simulation can then be specified in terms of the chosen discrete element material models independently of the individual model particles. A skilled person will be aware of the relationship between the rate of generation of particles, the initial conditions and the location in the three-dimensional simulation space that they are initialized.

BRIEF DESCRIPTION OF THE DRAWINGS

Various embodiments of the invention will now be described in detail by way of example only with reference to the following drawings.

DETAILED DESCRIPTION

Figure 1:
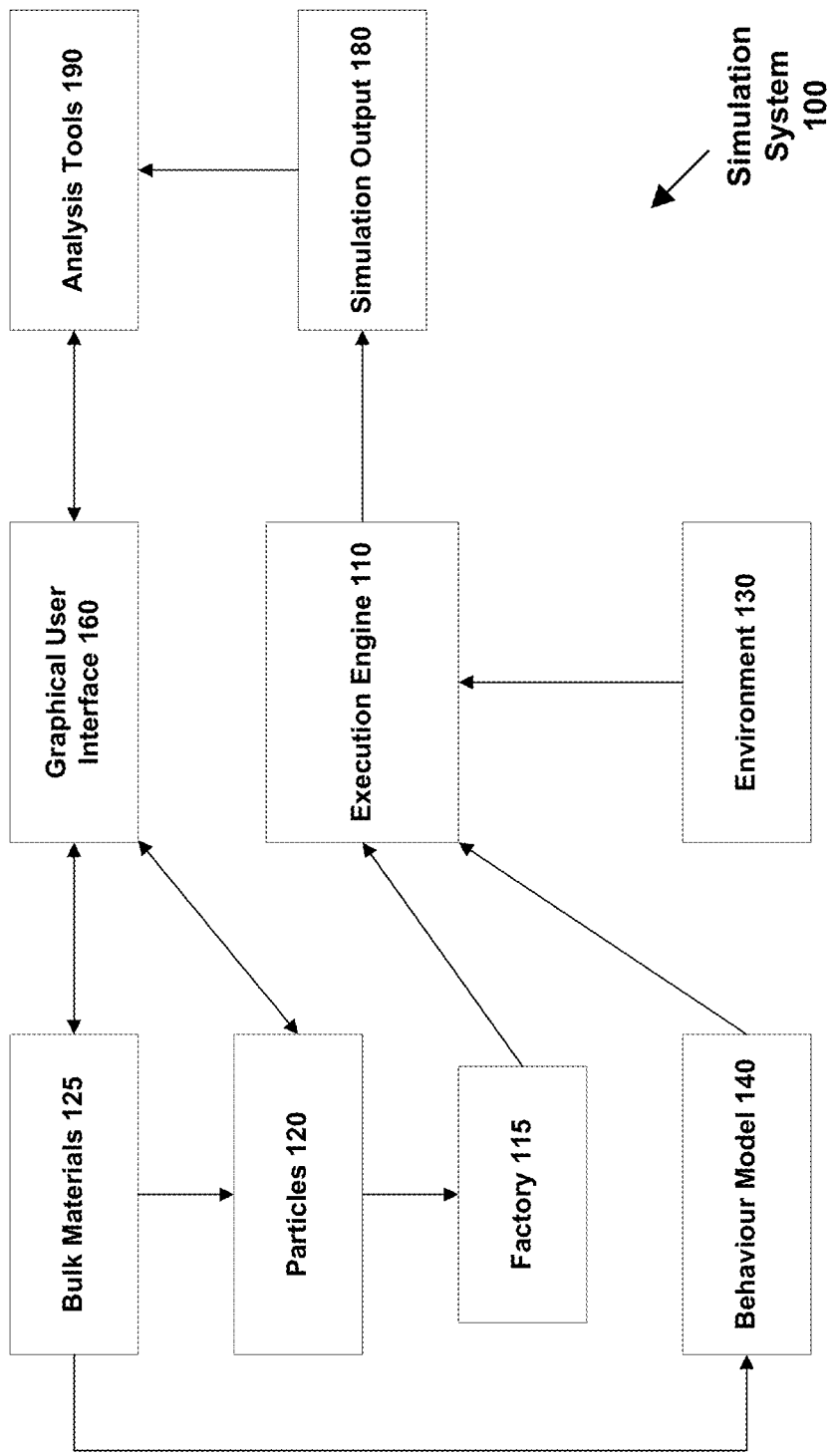
FIG. 1 is a schematic high-level diagram showing the main components of a simulation system in accordance with one embodiment of the invention.

FIG. 1 is a schematic diagram showing the operation of a simulation system 100 in accordance with one embodiment of the invention. The simulation system is based on an execution engine 110 which takes as input:

a set of particles 120 with properties, such as shape, size, etc. The properties typically specify physical attributes of the particles, as well as parameters for use in the simulation, such as residence time. The system supports multiple different types of particles in a single simulation. Particles may have various shapes and may comprise one or more particle elements. In one embodiment, the particle elements are spheres, but other embodiments may use other geometric shapes based on other surface geometry functions such as lines, discs, triangles, other planar elements, torus, ellipsoids, hyperellipsoids, polyhedra etc;

a bulk materials subsystem 125 that (if used) provides a mechanism for a user to specify properties of some or all of the particles used in a simulation. In particular, the bulk materials subsystem 125 allows a user to specify bulk properties of certain bulk materials. The subsystem 125 then uses these bulk properties to determine a corresponding set of particles 120 for use in the simulation;

an environment 130 specifying the surroundings of the particles, including boundary conditions and physical geometry elements. The environment determines the presence of other objects with which the particles may interact and whose behaviour is controlled separately from the particles themselves. The environment may define (for example) the size and shape of a container holding the particles, any objects within the container, plus any operational movement (such as for a conveyor belt). The environment may also specify fluids or fields, such as electric or magnetic, with which the particles may interact, e.g. to exchange momentum, mass or energy; and behaviour model 140 (also referred to as a physics model), which specifies the interactions of the particles (with each other and also with the surroundings as specified by the environment). One or more behaviour models 140 can be added as plug-ins to simulation system 100. Different behaviour models may apply to different interactions, e.g. particle-particle, particle-geometry, or particle-media. The interactions may result in the modification of some physical property of the particles, such as an exchange of momentum, mass or energy between the discrete elements, or between the discrete elements and their surroundings. An interaction may also change attributes of the discrete elements due to the operation of heuristics or other laws governing the interaction. For example, the presence of a particle in a particular location may change the value of an attribute such as color, a flag to indicate that the particle passed this way, the amount of time spent near a given surface, etc.

The simulation system includes one or more factories 115 which generate particle instances for use in the simulation corresponding to the template of particle properties and attributes. The factory initialises the inertial and dynamic conditions of each particle, including attributes such as size, shape, position, velocity etc.

The simulation system 100 also includes an execution engine (also referred to as the core solver) to determine the simulation outcome 180, based on the specified boundary conditions 130 and the behaviour model 140. This usually involves the execution engine performing many iterations to calculate particle behaviour over time.

The simulation system 100 further includes a graphical user interface (GUI) 160 and a range of analysis tools 190. The simulation output 180 can then be viewed and investigated via GUI 160 using analysis tools 190 to provide a better understanding of particle behaviour. For example, GUI 160 may support a graphical representation showing the path of travel for a particle as the simulation progresses. In addition, the simulation output 180 can be exported for analysis elsewhere, or for input to a further simulation.

Simulation system 100 provides particles 120 with a predefined set of fixed properties, for example size. Simulation system 100 also supports the assignment of customised properties to particles 120 to supplement the fixed properties. A generic framework is provided to allow arbitrary user-defined properties (also referred to as attributes or tags) to be assigned to a particle (i.e. a discrete entity or element) in a DEM. These properties are utilised both during the simulation solution itself by execution engine 110, and are also available for use in post-processing operations on a DEM simulation, such as by analysis tools 190. For example, the values of the custom particle properties are passed to the relevant behaviour model(s) for use in calculating particle interactions. The assignment of customised properties to particles can be performed automatically by a behaviour model 140; alternatively custom particle properties can also be added to particles 120 using GUI 160.

As described above, simulation system 100 includes factories 115 for creating particle instances during a simulation. The EDEM version 2.3 simulation system supports a "virtual geometry" for the initialisation of particles produced by factories 115. This virtual geometry does not interact with the particles or other objects, in contrast to the physical geometry elements of the environment 130 that do interact with the particles. Both the physical geometry elements and the virtual geometry elements for the initialisation of particles may be created within the simulation system itself, or else generated with a computer-aided design (CAD) system and then imported into the simulation system.

The factories 115 initialise particles by placing particles (for example) on the surface or within the closed volume of a virtual geometry section, or within the closed volume of a physical geometry section. As with the fixed particle properties, a factory has a list of factory parameters, one for each custom property. The parameters allow a user to dictate the initial value of the corresponding properties for particles created by the factory. For each parameter, the user can specify whether the initial value is set as: (a) a fixed (predefined) value, (ii) a random value, or (iii) taken from a normal distribution of values. A factory 115 may specify the initial location of a particle relative to a physical and/or virtual geometry element. This then allows a user to specify the location where particles are injected into (or originate within) the simulation system.

An important aspect of analysis tools 190 is the ability to calculate bulk statistics and aggregate properties based on the raw particle-scale results data. Such analysis involves selecting or grouping the particles together as desired. The analysis tools 190 allow a user to create a selection, which represents a list of elements, such as particles or physical geometry elements, that satisfy one or more specified criteria. The analysis tools 190 can then perform queries/graphing on just a part of the simulation, i.e. on the selected elements, rather than all of them. A selection may be used, for example, to change the colouring and/or representation options for the selected group of elements in a visualisation of the simulation outcome 180.

In the EDEM version 2.3 simulation system, two selection methods are available. The first method (referred to as manual selection) allows a user to select a set of particles at a given time using a visualization of the simulation. The three-dimensional particle locations from the simulation are projected onto the screen for the visualization in accordance with a selected viewing angle. A user defines a two-dimensional region, e.g. a box, on the screen, and all particles that appear to lie within that region are selected. These particles may then be marked differently, for example by using a different colour. As the visualization is subsequently moved forwards (or backwards) in time, the particles retain their differentiation (selection or grouping), irrespective of whether they remain in the specified region. This method of particle selection is therefore well-suited to investigating the trajectories of particles through the simulation, for example to find out where particles in a given region at a given time end up (or originate from).

The second method of particle selection (referred to as grid bin groups) in the EDEM version 2.3 simulation system utilises the intrinsic coordinate system (x, y, z axes) of the simulation. A user defines a grid of rectangular boxes (bins) that are aligned with this coordinate system—i.e. every box face is perpendicular to one of the axes. The analysis tools 190 can then provide information concerning the aggregate properties (such as number, mass, etc) of the particles that are located within each box at any given time. It is straightforward for the analysis tools to identify a particle as being within a specific grid box by comparing the x, y and z coordinates of the particle with the corresponding limits of the box. It will be noted that in this second method (unlike the first method) the selected particles are not fixed through time. Rather, the selection of particles will vary with time according to the current locations of the particles in relation to the bin boundaries.

Figure 2:
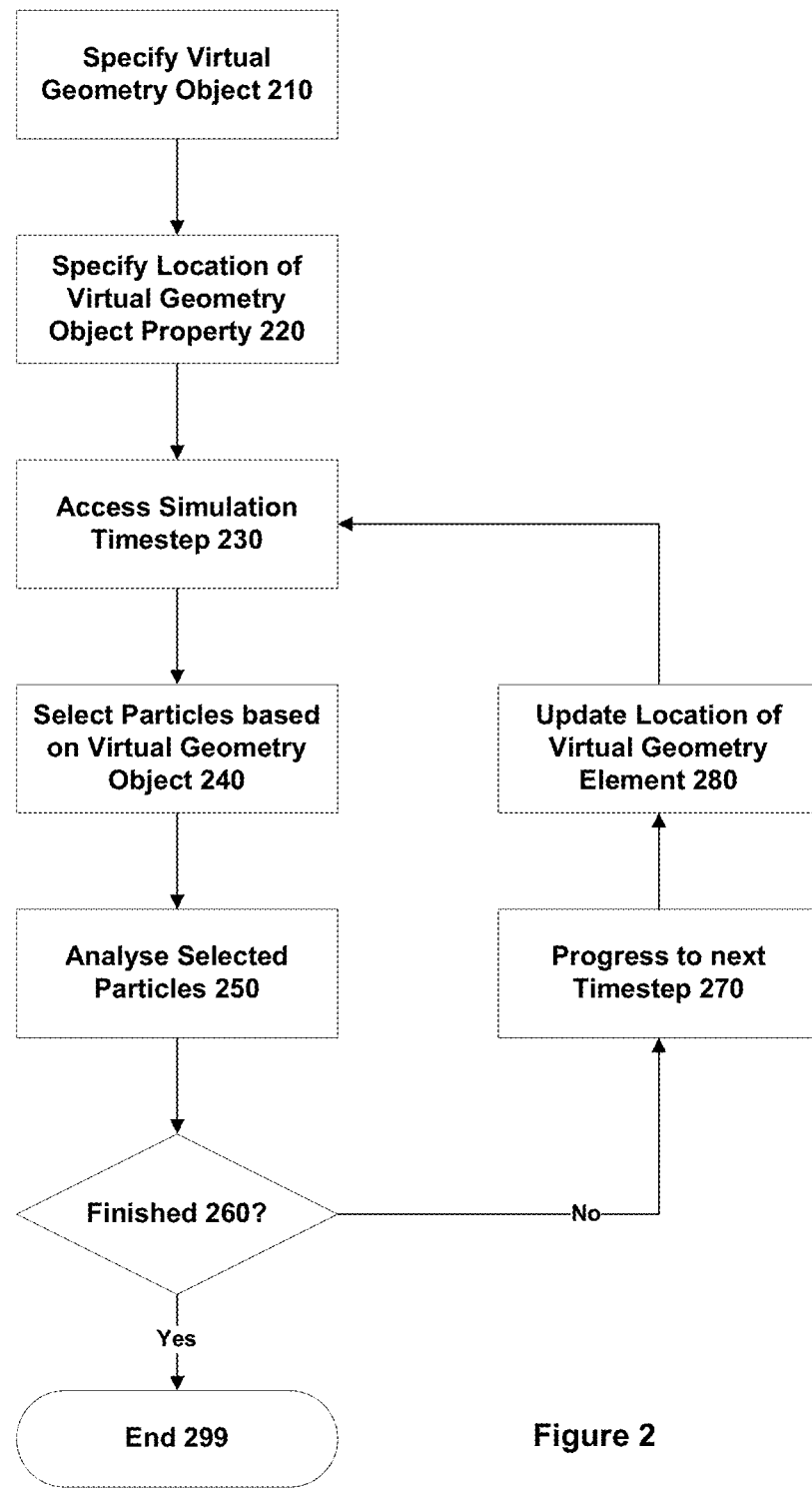
FIG. 2 is a high-level flowchart showing the use of a virtual geometry object for particle selection in accordance with one embodiment of the invention.

In accordance with an embodiment of the present invention, the simulation system 100 supports a further selection method within analysis tools 190. This method is illustrated in schematic form in FIG. 2. In operation 210, the user specifies a virtual geometry object. The system allows this to be done in two ways (analogous to the specification of the virtual geometry for a particle factory). The first way is that the simulation system 100 allows a certain range of shapes to be defined within the simulation system itself. The second way is that the simulation system 100 is able to import a shape created using a separate computer-aided design (CAD) system.

Note that the shape of the virtual geometry object specified at operation 210 is arbitrary, in the sense that the user can define the exact shape that they want. This is in contrast to the first method described above (manual selection), where the shape in three-dimensions is necessarily an orthogonal projection of the two-dimensional shape defined on the screen, and also in contrast to the second method described above (grid bin selection), where the shape in three-dimensions is necessarily a grid of rectangular cuboids.

In operation 220, the user specifies the location for the virtual geometry object within the three-dimensional space of the simulation. The location allows both the position and orientation of the virtual geometry object to be defined. Furthermore, the location is allowed to vary with time, in other words the virtual geometry object is able to move (and rotate) through the coordinate space as the simulation progresses. One option is to link the location of the virtual geometry object to a physical geometry element within the simulation. In this case, the location of the virtual geometry object is specified with reference to the physical geometry element. Therefore, if the physical geometry element moves (translation and/or rotation), the virtual geometry object moves in the same way.

In operation 230, for a specified time value (timestep), the simulation output 180 is accessed. The simulation output 180 includes a listing of particles and their properties for each time value, as well as the positions of any physical geometry elements. The particle positions from the simulation output 180 are now compared at operation 240 with the location of the virtual geometry object, and those particles are selected that satisfy a specified criterion (or criteria) in relation to the virtual geometry object—e.g. are inside, or close to, or have passed through the surface of the virtual geometry object.

For example, if the virtual geometry object is a closed volume, the listing of particles may be scanned, and the position for each particle is tested to see whether or not it lies within the solid volume. Those particles that are found to lie within the closed volume are selected. Note that in some embodiments, other elements, such as physical geometry elements, may be selected at operation 240 in addition to (or instead of) the particles 120.

At operation 250, an analysis is performed in respect of the selected elements, e.g. particles. This analysis may involve calculating one or more bulk properties for the set of selected particles, such as total or average mass, voidage, mix ratio, etc. Another possibility is that the analysis involves a visualisation, and the selected particles are differentiated, for example by colour, from the non-selected particles.

In operation 260, it is determined if the analysis is complete. If so, the analysis exits at operation 299. However, if the analysis is not yet complete, the analysis progresses at operation 270 to the next timestep. This usually involves moving forwards in positive time increments through the simulation data, but there may be circumstances in which it is decided to analyse the simulation progressing backwards in time (if supported by the system).

At operation 280, the location of the virtual geometry object is updated to the new time value. Processing now returns to operation 230 to determine which particles are selected by the virtual geometry object for this new time value. The newly selected particles are then analysed or visualised as discussed above at operation 240, and the processing is repeated until the analysis is completed (i.e. a positive outcome at operation 260).

Note that the location of the virtual geometry object may be based on the location of a physical geometry element in the simulation. In this case, updating the location of the virtual geometry object (as per operation 280) will involve accessing the position of the physical geometry element at the relevant timestep from the simulation output (as per operation 230), so that operation 280 will have to be performed after operation 230. In other embodiments, the position of the virtual geometry object may be fixed throughout the simulation, so that no updating is required at operation 280.

Figure 3:
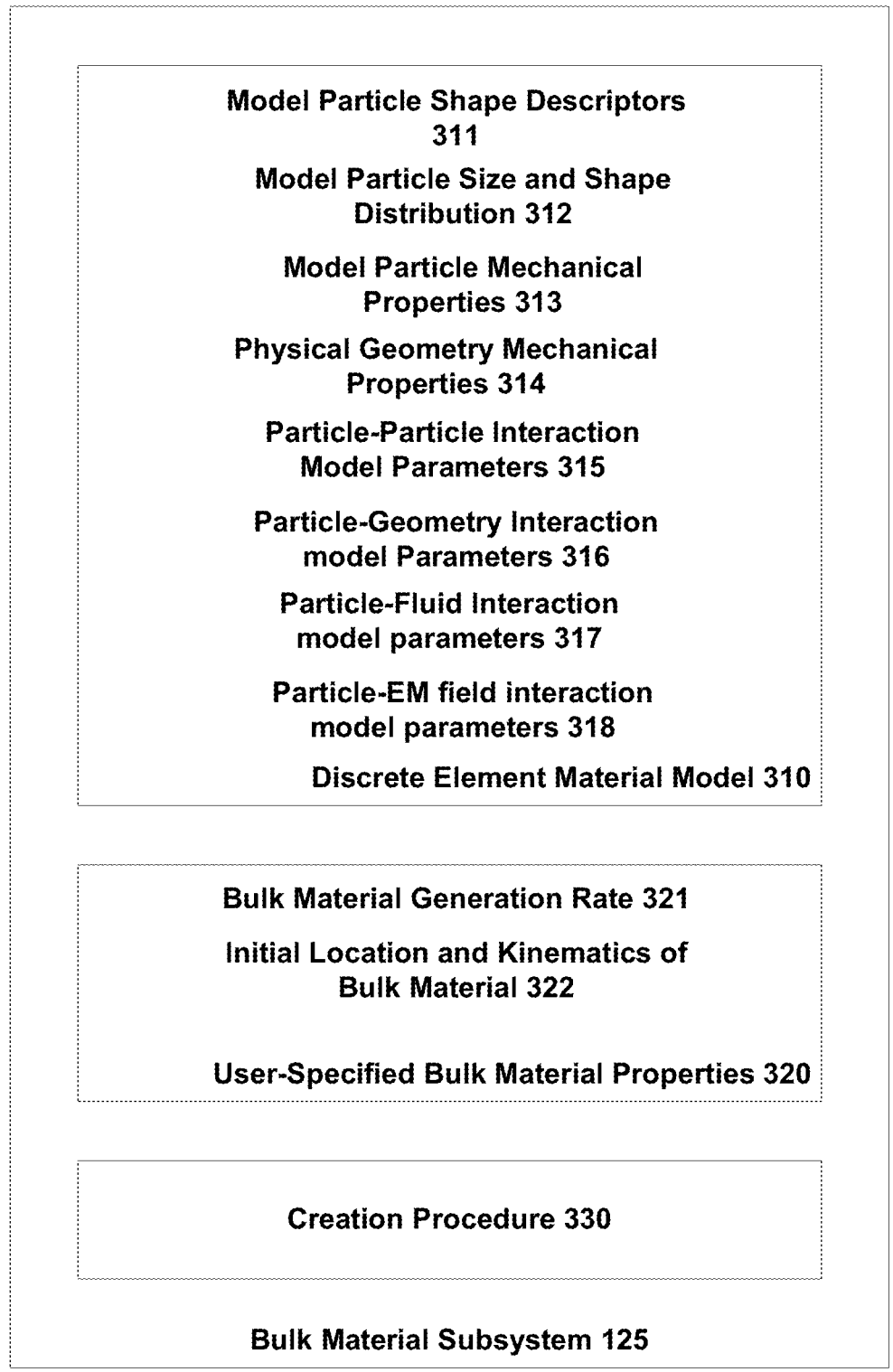
FIG. 3 is a schematic diagram showing the structure of a bulk materials subsystem in accordance with one embodiment of the invention.

FIG. 3 illustrates in more detail the bulk materials subsystem 125 from FIG. 1 in accordance with one embodiment of the invention. The bulk materials subsystem 125 contains a data object 310 called a discrete element material model (other names are a discrete element bulk material model, a DEM material model, or a DEM bulk material model). This data object contains system information for initializing and specifying the properties of particles 120 for a bulk material for use in a simulation. Note that although FIG. 3 shows only one data object 310 in the bulk materials subsystem 125, there may be multiple such data objects present, representing different bulk materials. Furthermore, additional data objects 310 (or enhanced versions of existing data objects) may be incorporated into the simulation system 100 as a form of upgrade or available from external sources.

Different data objects 310 may relate to different states of the same bulk material, for example, a wet form of the bulk material and a dry form of the bulk material. This is because the different states can be considered as different bulk materials for the purposes of a DEM simulation, since properties such as the particle size and shape, nature and strength of physical interactions, etc may vary according to these different states. One example of a bulk material with potentially different states is coal, which might be available (for example) as dry coal, wet coal, sticky coal, etc. These different options may reflect a different material (such as free flowing coal from mine X vs sticky coal from mine Y) and/or the same material that has changed its state or composition—and therefore its behaviour (such as dry, free flowing coal from mine Z that got wet and became sticky coal from mine Z).

The information contained in the data object includes a combination of model particle shape descriptors 311, model particle size and shape distribution 312, model particle mechanical properties 313, physical geometry mechanical properties 314 (this information is used in the particle-geometry interaction model parameters 316), and one or more of particle-particle interaction model parameters 315, particle-geometry interaction model parameters 316 (these control interactions of the particles with the physical geometry elements of the environment 130), particle-fluid interaction model parameters 317 and particle-electromagnetic field interaction model parameters 318 for the purposes of DEM simulation. The physical geometry mechanical properties 314, the particle-particle interaction model parameters 315, the particle-geometry interaction model parameters 316, the particle-fluid interaction model parameters 317 and the particle-electromagnetic field interaction model parameters 318 form part of the behaviour model 140 to use in a given simulation. Overall, it will be appreciated that the exact set of properties or information included in discrete element material model 310 will vary from one implementation to another and may also vary with the nature of the bulk material and/or the intended simulation (for example, certain forms of particle interactions might not be relevant for all simulations).

The bulk materials subsystem also includes a set of user-specified bulk material properties 320 associated with data object 310. These bulk material properties 320 may be entered into the simulation system 100 by the graphical user interface 160 (or imported, for example via an input file). Examples of such bulk material properties include the rate of generation of bulk particle material 321, and the initial location and kinematics of the bulk material 322. Again, it will be appreciated that the exact set of properties or information included in bulk material properties 320 will vary from one implementation to another. For example, bulk properties that might be specified in other implementations include temperature, moisture content, chemical composition and so on.

The traditional method of specifying particle generation in DEM involves the user detailing a set of initial conditions for component particles 120 of a bulk material for use in the simulation. The user also has to specify the relevant behaviour models 140 for the particles. In contrast to this traditional method, in one embodiment of the present invention, the user-specified conditions 320 for bulk material generation are used in combination with the model particle shape and size descriptors, etc in the discrete element material model 310 in a creation procedure-shown schematically as block 330 in FIG. 3. The creation procedure 330 transforms the discrete element material model 320 selected by the user into a set of variables and parameter values required by the DEM execution engine 110 to initialize (create) model particles, and to provide inputs to various physics algorithms for calculating the dynamics and state of the particles during the simulation.

Figure 4:
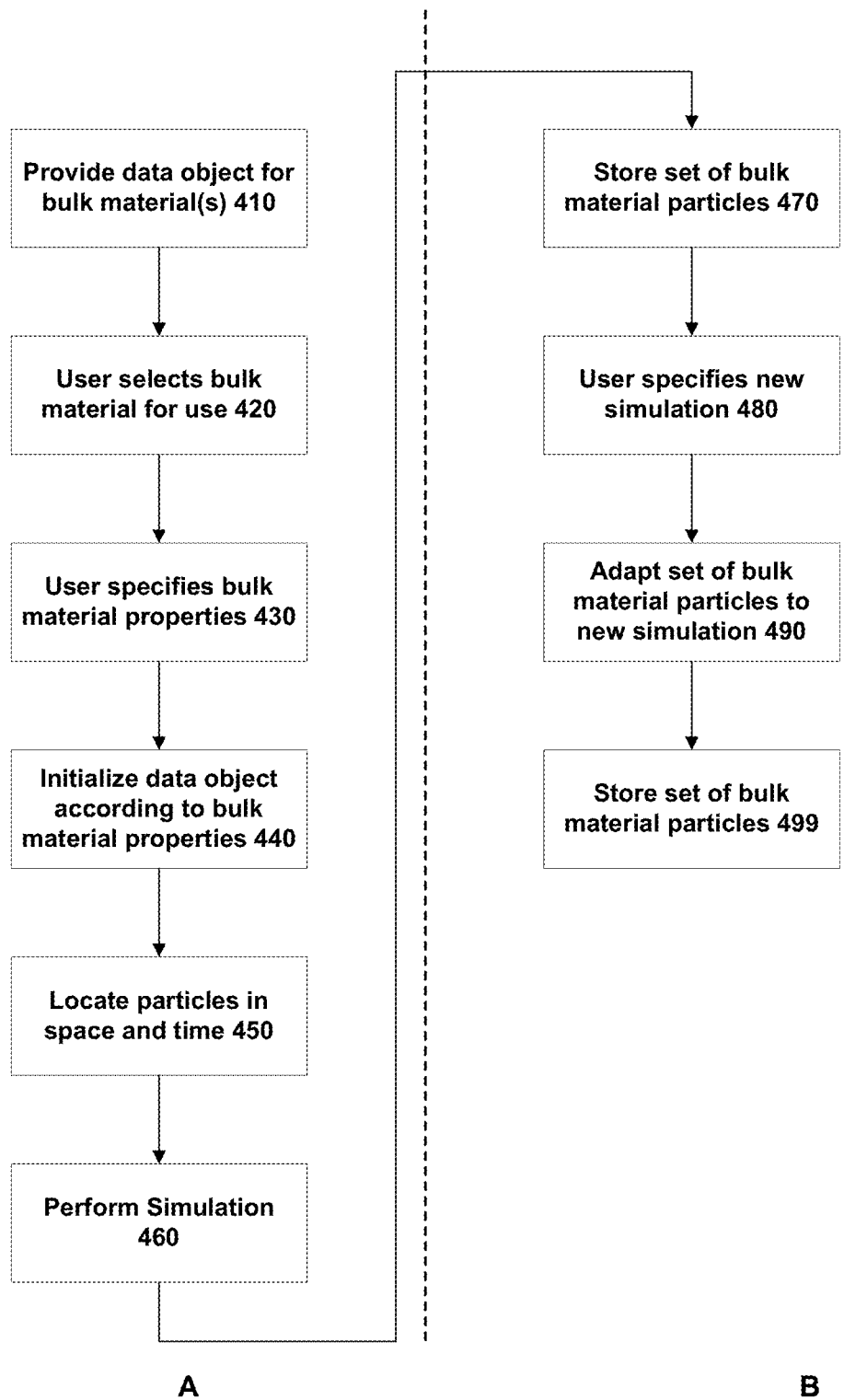
FIG. 4 is a high-level flowchart for performing a simulation on bulk material in accordance with one embodiment of the invention.

FIG. 4 is a flowchart illustrating the processing of bulk materials in accordance with one embodiment of the invention. The method commences with providing a discrete element material model 310 such as shown in FIG. 3 for a bulk material (operation 410). A different data object may be provided for each type of bulk material. There are various possible ways of creating such data objects. One possibility is to perform physical experiments to investigate the particle properties and behaviours of various bulk materials. Another possibility is to use information taken from existing DEM simulations, since these have traditionally received information at the particular level for the relevant materials. The simulation system 100 may be provided with multiple different discrete element material model 310 associated with different bulk materials, for example, a set of such discrete element material model 310 may be stored in (and available from) a database. As mentioned above, different data objects may be provided for different states of the same bulk material. In addition, the simulation system 100 may include facilities for users to create their own data objects (which may then be stored in a database), to import data objects from some other source, and so on.

The user now selects the bulk material for use, such as from a menu of different available bulk materials (operation 420), and then specifies bulk material properties 320 that they want to apply to a simulation using the selected bulk material (operation 430). The system now performs a creation procedure 330 to initialize the set of model particles specified by the discrete element material model 310 for the selected bulk material in accordance the bulk materials properties specified by the user. One such property (for example) is the material generation rate 321 (operation 450). The creation procedure 330 also uses the initial location and kinematics 322 specified by the user to locate the particles in time and space (operation 450). The particles may be created (for example) in a volume or on a plane according to the user specification for the bulk material. One way of controlling the initial locations of the particles is by using a virtual geometry, such as discussed above in relation to FIG. 2.

Note that the material generation rate 321 and the initial location and kinematics 322 can be regarded as configuration properties of the particles, in that they reflect the particular configuration adopted for the simulation, rather than any intrinsic (inherent) properties of the particles themselves (such as size and shape or nature of physical interactions). In this case the bulk material properties 320 can be regarded as a configuration imposed during the creation procedure 330 on a set of particles corresponding to the selected bulk material. In other cases, one or more of the bulk material properties (such as moisture content) might alter one or more of the intrinsic properties of the particles, such as particle shape or how the particles interact (such as their tendency to stick to one another). In these cases, the creation procedure 330 updates data object parameters such as the model particle size and shape distribution 312 and particle-particle interaction model parameters 315 in accordance with the specified bulk material properties. For example, increased moisture content may caused particles to enlarge, thereby leading to an increase in particle size. The relationship whereby user-specified bulk material properties 320 influence particle parameters in the discrete element material model 310 can be determined by suitable experiment and/or theoretical modelling.

There are certain states, such as chemical composition, for which a change could be considered as (i) defining a change in a property of the bulk material, or (ii) defining a different bulk material. Simulation system 100 can adopt either of these options as appropriate, based (for example) on the available experimental data and/or theoretical knowledge to develop a mapping between bulk material properties and particle properties. Note that the first option may accommodate a continuous range for the state (such as composition) according to a specified input parameter. In contrast, the second option generally only provides a predefined set of bulk materials corresponding to a predefined set of values for this state (such as a predetermined set of compositions).

Once the creation procedure 330 of operations 440 and 450 has completed, the system now performs a simulation using the specified particles (operation 460). In some cases, this simulation may complete the processing of FIG. 4. Thus operations 410-460 shown in the left-hand side of FIG. 4 (denoted as section A) may represent a complete set of processing, resulting in the output of the simulation 460. However, in accordance with some other embodiments, the processing is extended by virtue of the operations shown in the right-hand portion of FIG. 4 (denoted as section B), which indicates how a pre-packed model bulk may be used for simulations. One way of achieving such a pre-packed model bulk is to perform a simulation, such as shown in operation 460 of FIG. 4. In this embodiment, the particle shape and size descriptors of the discrete element material model 310 are used only once to generate an assembly of model particles whose subsequent motion is calculated for a certain period of time by the DEM execution engine 110. At the end of the chosen simulation period, the positions, orientations and any other calculated data concerning the state of the model particles in a volume of interest is saved in a data file (operation 470). At a later time, all or a selection of the ensemble of model particles in this model particle bulk volume can be extracted from the file and used, along with the associated discrete element material model 310, to generate the model bulk particle material in a different simulation. In these circumstances, a user can now specify new bulk material model properties (operation 480), and these are associated with particular model particles in the pre-defined (pre-packed) model bulk material (operation 490). It is assumed here that the new bulk material model properties make little or no change to intrinsic properties such as the size and shape of the particles (since these are generally fixed from the initial simulation at operation 460). However, a user might alter properties such as the initial location and kinematic properties of the particles, or the behaviour model to be used for particle interactions. Another simulation (operation 499) can now be performed based on set of previously created particles to which the new bulk material properties have been applied.

One way of implementing the processing shown in section B of FIG. 4 is to embed the discrete element materials model 310 in the DEM simulation input file, which may be produced as the results file from the simulation of operation 460. Another approach is to provide appropriate flags or identifiers in the input data file comprising the pre-defined assembly of model particles that are associated with specific data elements in the discrete element material model. Overall, the latter part of the processing of FIG. 4 enables the discrete element material model 310 to be extended to include the location and orientation of each model particle in modelled bulk material using a pre-packed (pre-specified) model bulk.

The processing described above may be utilised (for example) for the simulation of bulk material transfer operations, which is a common application of DEM simulation. One example is simulation of the conveyor transfer of crushed ore between a delivery conveyor and a receiving conveyor using transfer chutes. The approach described herein involves two main stages in creating the data required for a DEM simulation: the first dealing with the bulk materials transfer equipment, and the second dealing with the bulk material itself.

In the first stage, a digital model of the equipment may be read from a CAD geometry or surface mesh file. This file generally contains details of the parts of the equipment such as conveyor belts and skirts, chutes, rock boxes, hoppers, wear protection and deflector plates likely to come in contact with the bulk material. These parts are then allocated a material type. In particular, a user may be offered a choice for material type, based on those material types for which corresponding discrete element material model 310 are available from the database of discrete element material models. Such data objects include the relevant values of parameters, such as those parameters involved in the algorithms used for calculating the physics of contact between the equipment surfaces and the bulk material.

If a particular part is a moving part, such as a conveyor belt, the associated dynamics for that part are specified by the user. Another option is that the dynamics of an equipment part during the simulation may be calculated during the simulation according to some control algorithm or data transferred from a separate modeling component that is computing the equipment dynamics in response to various forces acting on equipment parts (including loading by the bulk material).

The second stage involves a user selecting the bulk material(s) whose transport through the equipment is to be simulated, such as from a menu that is populated with stored (or otherwise available) discrete element material models 310. For example, if the bulk material to be simulated is a particular bulk coal then a discrete element material model 310 for that coal will have been previously created. Next, the user creates the virtual volume or surface in (or on) which the component model particles of the model bulk material, as specified in the discrete element material model 310, will be generated during the simulation. This virtual geometry may be created interactively by the user or imported from a CAD file (as described above in relation to FIG. 2).

The user now specifies bulk material properties, such as the rate of generation of bulk material in the spatial region defined by the virtual geometry. This generation property may include information such as the mass or specific volume of material per unit time, plus any initial kinematic conditions such as translation or rotational velocity and/or acceleration for the ensemble of model particles that will be generated in accordance with the discrete element material model 310. On completion of this second stage, the data for initializing and controlling the DEM simulation of the bulk material can be made available to the execution engine 110 for performing a simulation.

To summarize, in such an approach, the user typically specifies the equipment geometry and dynamics, the zones where model particles will be generated and the desired rate of generation and initial velocity of the bulk material. The properties of the component model particles of the model particle bulk, such as the model particle size and shape distribution, particle density, particle stiffness, inter-particle friction and so on, are contained within the discrete element material model that is also specified. Note that the internals of discrete element material model 310 are generally not exposed the user. Rather, the properties specified in discrete element material model 310 are combined with the bulk scale data specified by the user to produce the required particles plus associated parameter values and formats for input to the DEM execution engine 110.

The approach described herein may also be used for DEM simulation of batch processing operations such as drum coating, drum mixing, grinding mills and silo discharge. In operations such as these, all the bulk material is created at the start of the simulation, and the properties of the material, and hence the associated data object associated with the material, may change during the simulation due to the effect of processing of the simulation. Note that such changes in the bulk material properties are not limited to batch processes, and may also occur in continuous processes, in which conditions or factors affecting the behaviour of bulk materials change (gradually) over time.

The procedure for generating input data for a DEM simulation of a batch process, or for a continuous throughput system such as conveyor transfer, generally employs the same stages of creating or importing the equipment geometry and specifying the geometry dynamics as described above. Likewise, the stages of selecting the bulk material(s), defining the generation zone(s), and specifying the model bulk material generation rate and the initial kinematics are similar to those described above. However, batch processing may also specify an additional process related to changes in the bulk material properties during processing. For example, if as a result of the physics of the process, the properties of the bulk material change significantly, then subsequent simulation may employ a different material model from that originally used (to reflect the current state of the bulk material, rather than its state at the start of the simulation). In one implementation, this may be accomplished by selecting a number of discrete element material models each representing a particular process condition or stage. This selection of discrete element material model 310 may be performed by a user in advance of the simulation, or dynamically during the simulation. For example, the simulation might determine the bulk material to be used in (selected for) the next batch of simulation. This selection could be based on one or more factors such as the state of the bulk material, the time or distribution of the bulk material, and/or some other factors computed during the DEM simulation.

One example simulation is a tablet coating process in which tablets are coated with a fluid sprayed on to the surface of the tablet bulk as the tablet bulk is rotated and mixed in a drum. The bulk material behaviour can change during the process as the tablets become coated with the fluid which changes the interaction between each tablet; for example, making them less rough, or making them tend to stick together.

Another example is comminution (grinding) of rock in a grinding mill. As the rock reduces in size, the bulk strength and distribution of contact forces within the bulk material change. The DEM simulation may be linked to a population balance model that provides information on the likely particle size distribution. Such information can then be used periodically to update the discrete element material model(s) used in the simulation to reflect the change in composition of the particle bulk. The simulation may also (or alternatively) involve coupling the DEM simulation with other physics simulation models, such a fluid dynamics simulation or smooth particle hydrodynamics simulation of the interstitial fluid (whereby the bulk material contains fluid as well as particles). The simulation of such a system may involve modifying the discrete element material model properties dynamically during the simulation.

Figure 5A:
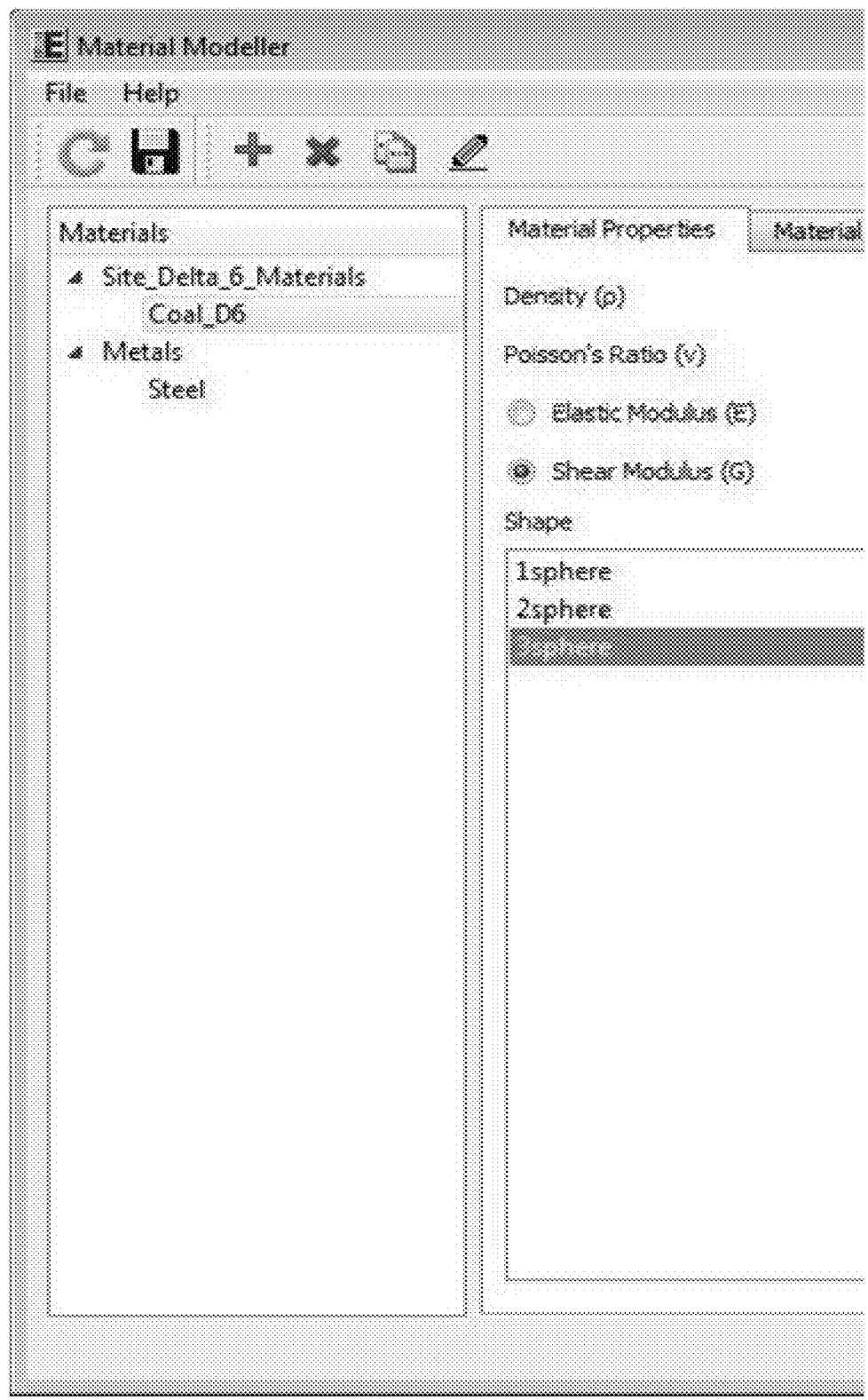
FIGS. 5A and 5B illustrate left and right portions, respectively, of a screen shot of a user interface for defining (in part) a discrete element material model for a bulk material in accordance with one embodiment of the invention.
Figure 5B:
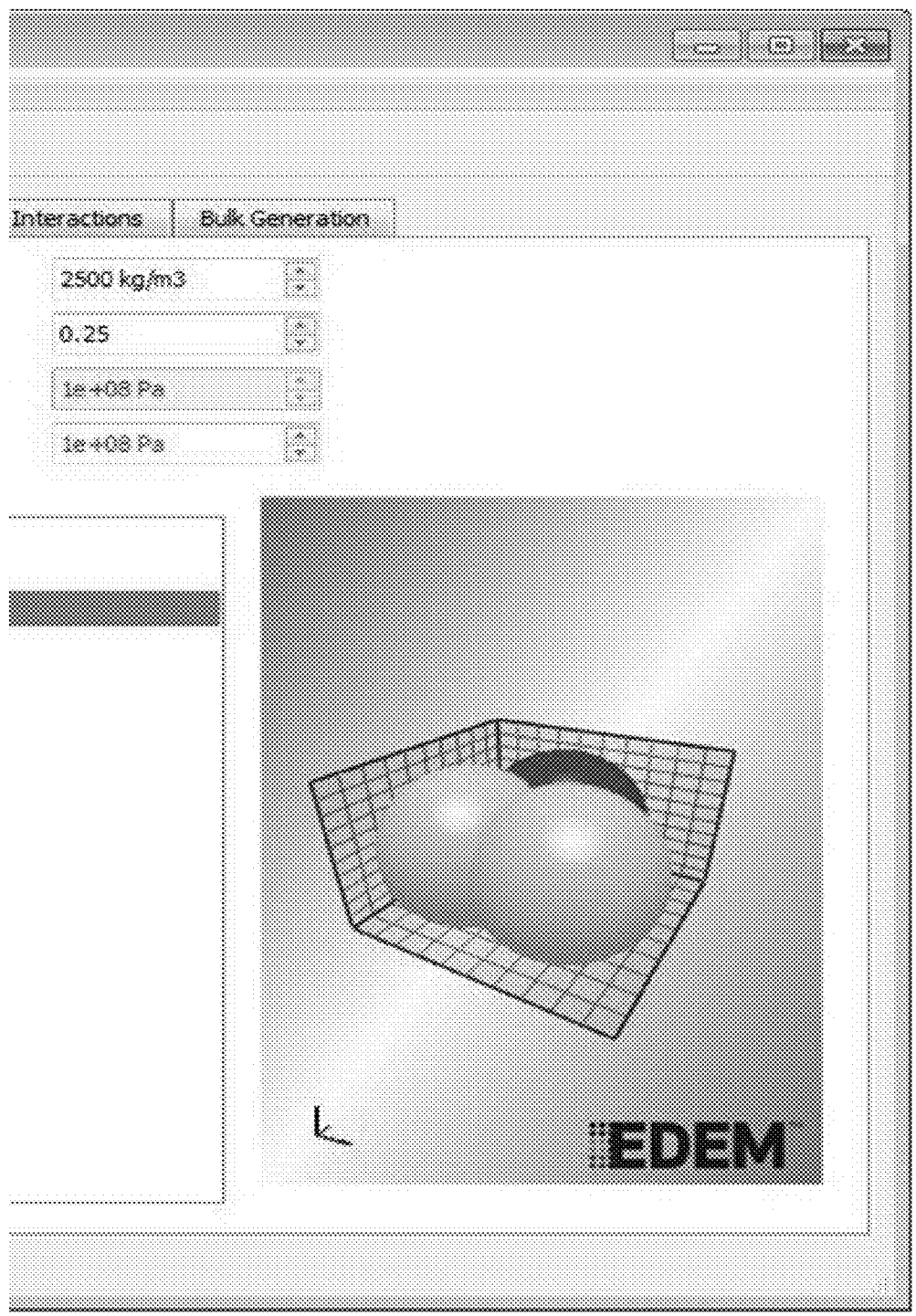

FIGS. 5A and 5B illustrate a left and a right portion, respectively, of a screen shot from graphical user interface 160 that is used in specifying a discrete element material model 310 in accordance with one embodiment of the invention (corresponding to operation 410 of FIG. 4). The left-hand pane in the screen illustrated in FIGS. 5A and 5B shows a specified material (in this case a form of coal referred to as "Coal_D6"). The right-hand pane in the screen illustrated in FIGS. 5A and 5B then allows the user to specified mechanical properties for particles of this material, in particular, the density, Poisson's ratio, elastic/shear modulus, and shape. These properties are then used to populate the parameters of a discrete element material model 310 for Coal_D6, such as model particle shape descriptors 311 and model particle mechanical properties 313.

FIGS. 5A and 5B also show two further tabs for the material modeller of the simulation system (in addition to the material properties tab depicted in FIGS. 5A and 5B). The first of these additional tabs, named Material Interactions, is used to specify the particle interactions for the material, corresponding to particle-particle interaction model parameters 315 and so on. The second of these additional tabs, Bulk Generation, is used to specify the size distribution of the particles for the material, corresponding to the model particle size distribution parameter 312 of FIG. 3.

Accordingly, the material modeller user interface depicted in FIGS. 5A and 5B can be used to create a discrete element material model 310. It will be appreciated that once such a discrete element material model 310 has been created, it may be used in multiple simulations (with different user-specified bulk material properties). In addition, a user may not necessarily have to utilise the material modeller themselves, but may be able to acquire the discrete element material model 310 from a third party (such as the provider of discrete element material model calibration services with expertise in deciding on the appropriate set of model particle properties and behaviour models and in determining suitable values for said properties and for parameters for said behaviour models, and/or the provider of simulation system 100).

Figure 6A:
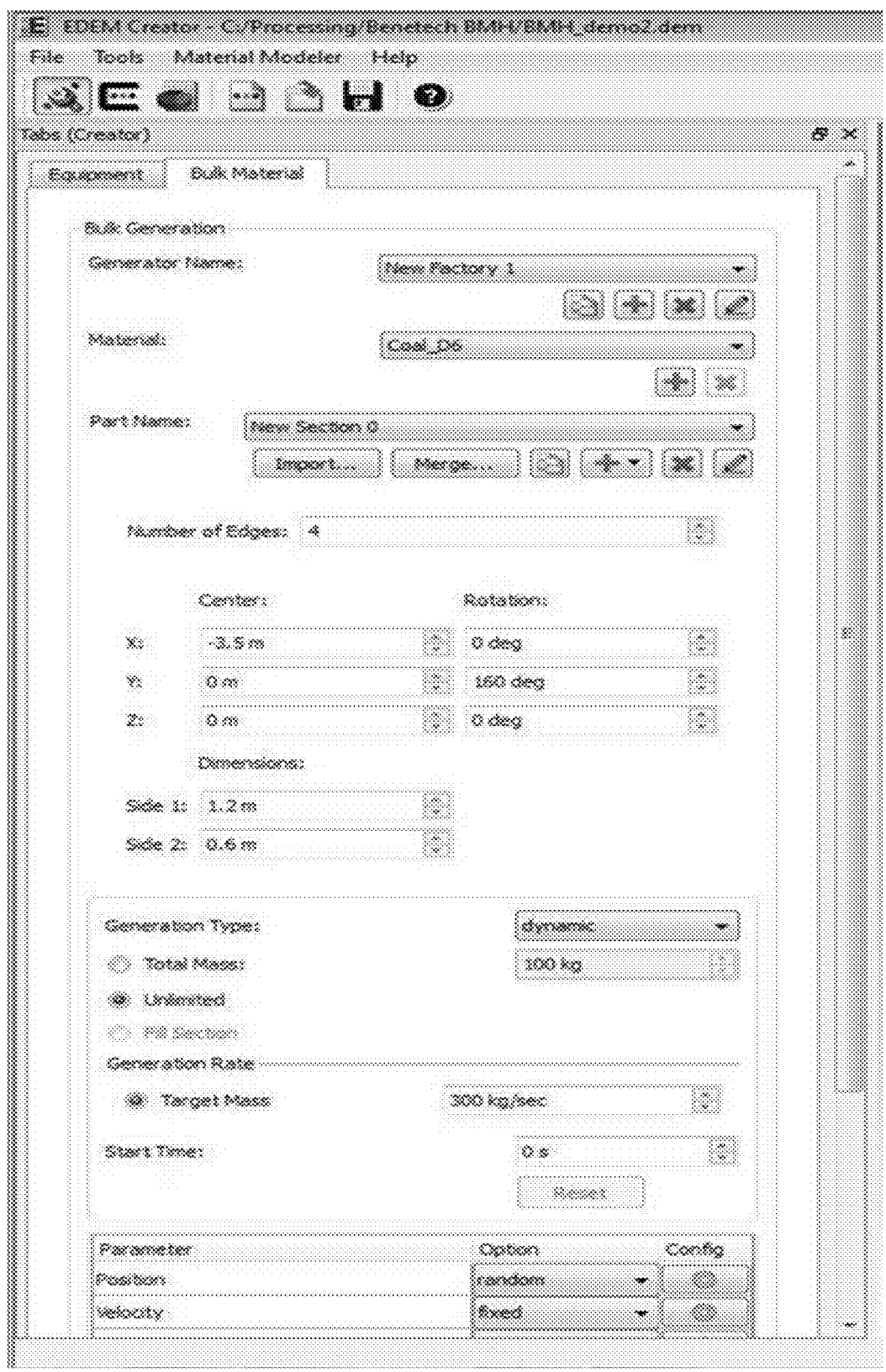
FIGS. 6A and 6B illustrate left and right portions, respectively, of a screen shot of a user interface for specifying a simulation involving a bulk material in accordance with one embodiment of the invention.
Figure 6B:
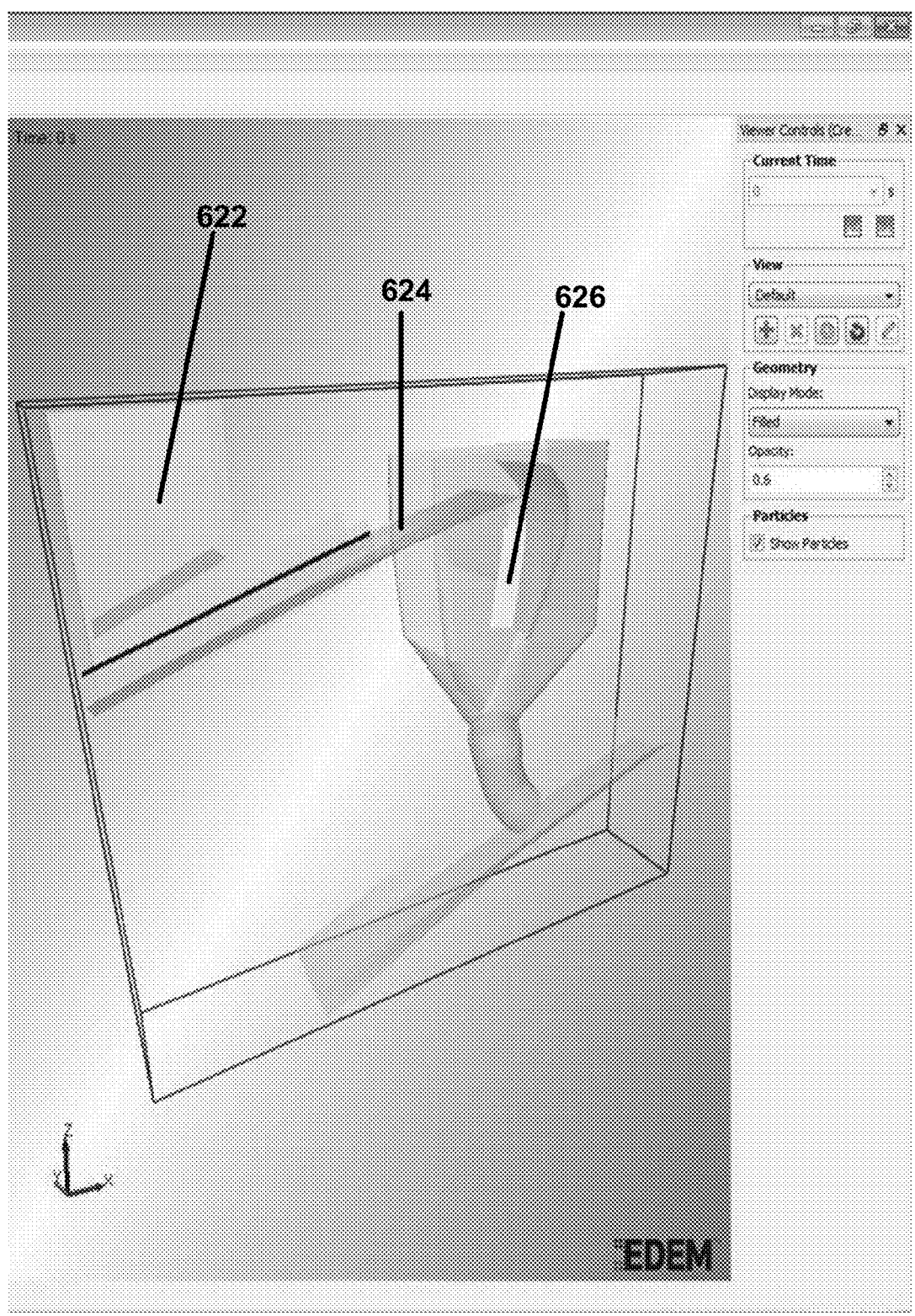

FIGS. 6A and 6B illustrate left and right portions, respectively, of a screen shot from graphical user interface 160 that is used in selecting a bulk material and specifying bulk material properties 320 for the selected bulk material in accordance with one embodiment of the invention (corresponding to operations 420 and 430 of FIG. 4). The screen shown in FIGS. 6A and 6B comprises three panes. The centre pane is an illustration of the simulation geometry, while the right-hand pane is used to control the view displayed in the centre pane (such as whether or not particles are displayed). The centre pane shows physical geometry elements including a conveyor 624 and a chute 626. This simulation models the flow of material along conveyor 624 into chute 626. The material is created within virtual geometry element 622, from where it initially falls onto the conveyor.

The left-hand pane allows a user to specify various parameters for use in the simulation. The Generator Name parameter specifies a factory 115 for creating material. The Material parameter allows a user to specify a particular bulk material to use in the simulation. In the screen shot shown in FIGS. 6A and 6B, the user has selected the bulk material Coal_D6 (corresponding to the material modelled in the screen shot shown in FIGS. 5A and 5B). The next portion of the left-hand pane, Part Name, allows a user to specify the properties (size and shape) of the virtual geometry element 622 in which the bulk material is to be created during the simulation.

The bottom portion of the left-hand pane allows a user to specify details of the bulk material generation rate 321, in this case 300 kg per second. This creation is dynamic (continuous or ongoing), and there is no limit on the total mass created. This portion of the left-hand pane also allows a user to specify details of the initial location and kinematics of the bulk material 322 (within the virtual geometry element 622). For example, the bulk material might be specified as being created at the top (or bottom) of virtual geometry element 622, with a certain vertical velocity downwards. This information is then used in operations 430-450 (as described above) to initialize the simulation, ready for execution.

As shown in FIGS. 5A, 5B, 6A, and 6B, in one embodiment, the model bulk materials (corresponding to discrete element material model 310) may be represented to the user as named discrete element material models (such as Coal_D6). The model bulk materials can then be combined with geometry elements in the form of CAD models or surface meshes representing the physical geometry in the discrete element simulation. For example, in one embodiment the process of creating the discrete element model input file for simulating a coal bulk passing from one conveyor to another via a chute (such as shown in FIGS. 6A and 6B) involves selecting a discrete element material model of the coal bulk (which may have previously been created, such as shown in FIGS. 5A and 5B), either reading from disk or otherwise creating the computer-aided drawing of the physical geometry of the conveyors and the chute, selecting the material type for the conveyor and the chute and specifying the rate of generation and initial dynamics of the coal, and the dynamics of the conveyors in the simulation. In this embodiment the discrete element material model also contains information concerning the interaction between model particles and the physical geometry elements.

The approach described herein therefore provides a new user interface for DEM simulation based on consideration of the bulk material being simulated at the "bulk-scale" rather than at the usual "particle-scale". This simplifies the requirements for a user to create a DEM model, and also provides a mechanism for users to share bulk material models. More particularly, the traditional approach to DEM modeling involves the specification of the size and shape distribution of the model particles comprising the ensemble of discrete particles (elements) in a simulation, and setting the values of the parameters in the particle-scale contact algorithm(s) employed in the DEM model. This set of geometric and mechanical attributes collectively govern the simulated mechanical behaviour of the particle bulk in a simulation. A typical traditional DEM software user interfaces separates the process of specifying the model particle size and shape (corresponding to particles 120 in FIG. 1) from the process of specifying the mechanical properties of the particles defined by the relevant contact algorithm (corresponding to behaviour model 140 of FIG. 1). Both processes are usually carried out using a Graphical User Interface (such as GUI 160 from FIG. 1) to capture user data input, or by the user creating ad-hoc, or editing a data file or script that contains the various data and instructions to be employed at the time of simulation.

In contrast, the approach described herein provides a user interface that allows the user to select the bulk material(s) to be modeled using pre-defined data objects (referred to herein as discrete element material models). Each such data object contains all of the information for initializing and specifying the model particles used in a simulation within a model particle bulk. In certain embodiments, the discrete element material model also specifies the physical geometry material and the interaction parameters with reference to the geometry material and/or to a bulk particle material.

The approach described herein therefore helps to increase the ease-of-use of DEM simulation and to reduce dependence on experts to ensure the predictive quality of models employed. The separation of the process of specification of the DEM material model from the process of DEM simulation helps businesses to engage in DEM simulation using non-experts who do not necessarily have knowledge of the particle-scale model specification inherent to a DEM computation (which operates at the particle-scale). This separation underpins the use of calibrated DEM models of bulk materials and allows businesses to separate the process of generating a calibrated or validated DEM material model from the process of carrying out DEM simulation itself, such as for assisting in the design and optimization of bulk materials handling and processing equipment.

The simulation system described herein is generally implemented by executing one or more computer programs running on one or more computers as appropriate. Some or all of the functionality of the simulation system might be implemented using special-purpose hardware if so desired. Prior to execution, the computer programs may be stored in a computer-readable storage medium such as a hard disk drive, flash memory, an optical disk (e.g. DVD), and so on.

In conclusion, various embodiments of the invention have been described by way of example only, and having regard to particular environments and application requirements. The person of ordinary skill in the art will appreciate that many variations may be made to the particular implementations described herein without departing from the spirit and scope of the invention as defined by the appended claims and their equivalents.

The invention claimed is:

1. A computer-implemented method for discrete element modelling of a plurality of discrete elements corresponding to particles and physical geometry elements, wherein said modelling performs a simulation through time of physical interactions of the particles with each other and with the physical geometry elements in a three-dimensional space, the method comprising:

providing, in a computer memory, a plurality of discrete element material models, each discrete element material model corresponding to a respective bulk material and containing (i) information regarding the properties of particles within said bulk material, and (ii) information regarding the interactions of such particles;

receiving from a user, through a user interface: (i) a selection of a bulk material for use in a simulation, and (ii) a specification of properties associated with the selected bulk material;

generating, using a computer, a set of particles of the selected bulk material for use in the simulation based on (i) the discrete element material model for the selected bulk material, and (ii) the properties of the bulk material specified by the user; and performing, using a computer, a discrete element model simulation on said set of particles, wherein said simulation uses the information regarding the interactions of particles from the discrete element material model for the selected bulk material.

2. The method of claim 1, wherein the information regarding the interactions of particles includes information regarding the interactions between the particles and the physical geometry elements.

3. The method of claim 1, wherein the information regarding the interactions of particles includes information regarding the interactions between the particles and a surrounding electromagnetic field.

4. The method of claim 1, wherein the information regarding the interactions of particles includes information regarding the interactions between the particles and a surrounding fluid.

5. The method of claim 1, wherein different discrete element material models are provided for different respective states of a given bulk material.

6. The method of claim 1, wherein providing a plurality of discrete element material models comprises storing said plurality of discrete element material models in a database, and offering the user a selection of bulk materials corresponding to respective discrete element material models in the database.

7. The method of claim 1, wherein the information regarding the properties of particles within said bulk material specifies the distribution of particle size and shape and the mechanical properties of the particles.

8. The method of claim 1, wherein the properties associated with the selected bulk material that are specified by the user include at least one of: (i) a bulk material generation rate, and (ii) an initial location and kinematics of the bulk material.

9. The method of claim 1, wherein the properties associated with the selected bulk material are used to update at least one of: (i) the information regarding the properties of particles within said bulk material, and (ii) the information regarding the interactions of such particles within the discrete element material model for the selected material.

10. The method of claim 1, further comprising updating the properties of the bulk material specified by the user as the discrete element model simulation progresses.

11. The method of claim 1, further comprising updating the selected bulk material as the discrete element model simulation progresses.

12. The method of claim 1, wherein performing a discrete element model simulation on said set of particles comprises:
performing a preliminary, limited simulation to generate an ensemble of simulated particles of said selected bulk material;
saving said ensemble of simulated particles of said selected bulk material;
receiving from a user a further specification of properties associated with the selected bulk material;
adapting said ensemble of simulated particles in accordance with the further specification of properties; and
performing a further simulation using said adapted ensemble of simulated particles.

13. The method of claim 1, further comprising coupling the discrete element modeling with a fluid dynamics simulation or smooth particle hydrodynamics simulation when the bulk material contains fluid as well as particles.

14. A computer program product for discrete element modelling of a plurality of discrete elements corresponding to particles and physical geometry elements, wherein said modelling performs a simulation through time of physical interactions of the particles with each other and with the physical geometry elements in a three-dimensional space, the computer program product comprising program instructions encoded on a non-transitory machine-readable storage medium, said instructions, when loaded and executed by one or more computer processors, causing the one or more processors to execute a method comprising:
providing a plurality of discrete element material models, each discrete element material model corresponding to a respective bulk material and containing (i) information regarding the properties of particles within said bulk material, and (ii) information regarding the interactions of such particles;
receiving from a user: (i) a selection of a bulk material for use in a simulation, and (ii) a specification of properties associated with the selected bulk material;
generating a set of particles of the selected bulk material for use in the simulation based on (i) the discrete element material model for the selected bulk material, and (ii) the properties of the bulk material specified by the user; and
performing a discrete element model simulation on said set of particles, wherein said simulation uses the information regarding the interactions of particles from the discrete element material model for the selected bulk material.

15. Apparatus for discrete element modelling of a plurality of discrete elements corresponding to particles and physical geometry elements, wherein said modelling performs a simulation through time of physical interactions of the particles with each other and with the physical geometry elements in a three-dimensional space, the apparatus comprising:
a database containing a plurality of discrete element material models, each discrete element material model corresponding to a respective bulk material and containing (i) information regarding the properties of particles within said bulk material, and (ii) information regarding the interactions of such particles;
a user interface for receiving: (i) a selection of a bulk material for use in a simulation, and (ii) a specification of properties associated with the selected bulk material;
an initialization system, implemented on a computer, for generating a set of particles of the selected bulk material for use in the simulation based on (i) the discrete element material model for the selected bulk material, and (ii) the properties of the bulk material specified by the user; and
an execution engine, implemented on the computer, for performing a discrete element model simulation on said set of particles, wherein said simulation uses the information regarding the interactions of particles from the discrete element material model for the selected bulk material.

16. The apparatus of claim 15, wherein the information regarding the interactions of particles includes information regarding the interactions between the particles and the physical geometry elements.

17. The apparatus of claim 15, wherein the information regarding the interactions of particles includes information regarding the interactions between the particles and a surrounding electromagnetic field.

18. The apparatus of claim 15, wherein the information regarding the interactions of particles includes information regarding the interactions between the particles and a surrounding fluid.

19. The apparatus of claim 15, wherein the properties associated with the selected bulk material are used to update at least one of: (i) the information regarding the properties of particles within said bulk material, and (ii) the information regarding the interactions of particles within the discrete element material model for the selected material.

20. The apparatus of claim 15, wherein the discrete element modeling is coupled with a fluid dynamics simulation or smooth particle hydrodynamics simulation when the bulk material contains fluid as well as particles.

\* \* \* \* \*